United States Patent
Hyugaji et al.

(10) Patent No.: US 11,088,628 B2
(45) Date of Patent: Aug. 10, 2021

(54) SWITCHING POWER SUPPLY DEVICE

(71) Applicants: Takumi Hyugaji, Isehara (JP); Takeshi Sato, Yokohama (JP); Minoru Kado, Hachioji (JP)

(72) Inventors: Takumi Hyugaji, Isehara (JP); Takeshi Sato, Yokohama (JP); Minoru Kado, Hachioji (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/813,410

(22) Filed: Mar. 9, 2020

(65) Prior Publication Data
US 2020/0313562 A1 Oct. 1, 2020

(30) Foreign Application Priority Data
Mar. 27, 2019 (JP) .............................. JP2019-060417

(51) Int. Cl.
*H02M 3/335* (2006.01)

(52) U.S. Cl.
CPC ... *H02M 3/33592* (2013.01); *H02M 3/33576* (2013.01)

(58) Field of Classification Search
CPC ............. H02M 3/335; H02M 3/33576; H02M 3/33592; H02M 3/33507; H02M 3/33569
See application file for complete search history.

(56) References Cited

U.S. PATENT DOCUMENTS

| | | | |
|---|---|---|---|
| 7,633,780 B2 | 12/2009 | Endo et al. | |
| 9,030,131 B2 | 5/2015 | Kado et al. | |
| 9,331,593 B2 | 5/2016 | Hyugaji et al. | |
| 9,602,010 B2 | 3/2017 | Arima et al. | |
| 9,825,548 B2 | 11/2017 | Choi et al. | |
| 10,536,089 B2 | 1/2020 | Hyugaji et al. | |
| 2007/0201253 A1 | 8/2007 | Endo et al. | |
| 2018/0358902 A1* | 12/2018 | Duvnjak | H02M 3/33592 |
| 2019/0020282 A1* | 1/2019 | Li | H02M 1/08 |

FOREIGN PATENT DOCUMENTS

JP 4862432 B2 2/2006

* cited by examiner

*Primary Examiner* — Gary L Laxton
(74) *Attorney, Agent, or Firm* — Holtz, Holtz & Volek PC

(57) ABSTRACT

A switching power supply device includes a transformer for voltage conversion, a synchronous rectification MOS transistor, a secondary side control circuit, and a minimum on-time setting circuit. The synchronous rectification MOS transistor is connected in series to a secondary side coil of the transformer. The secondary side control circuit performs on/off control of the synchronous rectification MOS transistor based on a drain voltage of the synchronous rectification MOS transistor. The minimum on-time setting circuit sets a minimum on-time when turning on the synchronous rectification MOS transistor based on a peak period and a bottom period detected by the secondary side control circuit.

12 Claims, 8 Drawing Sheets

SWITCHING POWER SUPPLY DEVICE

CROSS REFERENCE TO RELATED APPLICATION

This application is based upon and claims the benefit of priority under 35 USC 119 of Japanese Patent Application No. 2019-060417 filed on Mar. 27, 2019, the entire disclosure of which, including the description, claims, drawings and abstract, is incorporated herein by reference in its entirety.

BACKGROUND OF THE INVENTION

1. Field of the Invention

The present invention relates to a direct-current power supply device of a switching control system including a transformer for voltage conversion, and, for example, relates to a technique effective for use in an insulated DC-DC converter including a synchronous rectification switch on the secondary side of the transformer.

2. Description of Related Art

One of conventional switching power supply devices is a switching power supply device (insulated DC-DC converter) including: a MOS transistor (insulated-gate field-effect transistor) as a switching element for intermittently flowing a current to a primary side coil of a transformer; and a control circuit (IC) that performs on/off control of the element, in which a current induced in a secondary side coil by the current flown to the primary side coil is rectified by a diode, and smoothed by and output from a capacitor.

In an insulated DC-DC converter in which a rectification diode is used in a secondary side circuit, a loss in the rectification diode is large, which causes a reduction in efficiency. Therefore, there is a technique for providing a switching element (MOS transistor) for synchronous rectification instead of a rectification diode in the secondary side circuit, detecting a terminal voltage (source-drain voltage) of the secondary side switching element with a secondary side control circuit, and performing turn-on control of the secondary side switching element at a timing at which a forward current flows into a body diode, thereby reducing a loss in the rectification element and increasing the efficiency (for example, JP 4862432 B2).

In a switching power supply device of a secondary side synchronous rectification system, a turn-on signal is raised generally upon detecting that a drain voltage of a synchronous rectification MOS transistor has become smaller than or equal to a predetermined determination threshold value. Since ringing RG occurs immediately after a source-drain voltage VDS falls, and the synchronous rectification MOS transistor is turned on, as shown at (A) and (B) in FIG. 9, this ringing may cause erroneous detection of a turn-off timing. Therefore, a technique for setting a minimum on-time in order to prevent such erroneous detection of turn-off is known (for example, U.S. Pat. No. 9,825,548 B2). Since a source terminal of the synchronous rectification MOS transistor is generally connected to a ground point on the secondary side, the source-drain voltage will be briefly referred to as a drain voltage in the following description.

Techniques for setting the minimum on-time include a fixed system of setting the minimum on-time at a predetermined value and a variable system of changing the minimum on-time. The length of ringing of a drain voltage VDS immediately after turn-on changes depending on the magnitude of a load. Thus, in the case of the fixed minimum on-time system, the minimum on-time may be insufficient at a heavy load to cause erroneous detection of turn-off as shown at (B) in FIG. 9, and the minimum on-time may be too long at a light load, and a reverse current may flow immediately before turn-off as shown at (C) in FIG. 9. At (B) and (C) in FIG. 9, t21 and t22 are desirable turn-off timings.

Therefore, in the invention described in U.S. Pat. No. 9,825,548 B2, the minimum on-time is set on the basis of a secondary side conducting period.

In a system of setting the minimum on-time on the basis of a secondary side conducting period as in the invention described in U.S. Pat. No. 9,825,548 B2, when the primary side is turned off suddenly because of an influence of noise or the like, and energy accumulated in a transformer decreases, the secondary side conducting period may become shorter as a consequence, and a gate drive pulse in which the minimum on-time is longer than the secondary side conducting period may be generated, and a reverse current may flow. In a case where the primary side control system is a PWM (pulse width modulation) system or a QR (flyback quasi-resonant) system, repetitive control is performed in which the primary side is turned on, the secondary side is turned on, the primary side is turned on, the secondary side is turned on, . . . , so that the minimum on-time in the current cycle is settled on the basis of the secondary side conducting period in an immediately preceding cycle. Thus, a problem arises in that, in such a case where a behavior on the primary side changes suddenly and significantly, the minimum on-time on the secondary side significantly departs from an appropriate value.

On the other hand, since a peak period of the drain voltage of the synchronous rectification MOS transistor can be regarded substantially as the primary side conducting period, a system of settling the minimum on-time on the basis of the peak period of the drain voltage can also be considered. This system allows the minimum on-time to be settled in agreement with a substantial magnitude of a load, while in a case where the primary side control system is the PWM system or QR system, the peak value and the peak width of the drain voltage are in proportion to an input voltage. Thus, a problem arises in that the minimum on-time is influenced by an input voltage when only the peak width of the drain voltage is used as a reference, so that the minimum on-time cannot be settled in agreement with the magnitude of a load without being influenced by the input voltage.

In a case of control of not stopping switching when the input voltage is reduced, the influence is particularly significant. The minimum on-time may become too long with respect to the secondary side conducting period, and a large reverse current may be produced.

Therefore, eliminating input voltage dependence by settling the minimum on-time utilizing a product of the peak width and the peak value of the drain voltage can also be considered. However, in configuring a circuit having such a function, a function of linearly detecting the drain voltage is required, and a circuit having a high withstand voltage and high performance of linearly detecting the voltage needs to be designed because the drain voltage has a wide voltage range of approximately 10 V to 200 V (still wider depending on conditions). Thus, the difficulty in achieving the circuit increases.

Since a relation "the peak period of the drain voltage>>the secondary side conducting period" holds during subharmonic oscillation in the PWM system, a problem arises in that the minimum on-time may become too long with respect to the secondary side conducting period even if the minimum on-time is settled on the basis of a product of the peak width and the peak value of the drain voltage, and a reverse current may flow.

SUMMARY OF THE INVENTION

The present invention has been made to solve the above-described problems, and has an object to, in a switching power supply device including a transformer for voltage conversion and a secondary side synchronous rectification switching element, restrain an influence of an input voltage and allow a minimum on-time to be settled in agreement with the magnitude of a load even if a peak value and a peak width of a drain voltage change in accordance with a change in the input voltage.

The present invention has another object to, in such a case where a behavior on the primary side has changed suddenly and significantly, prevent the minimum on-time on the secondary side from departing significantly from an optimum value.

The present invention has still another object to eliminate the need for a circuit that linearly detects the drain voltage, that is, to decrease the difficulty in achieving the circuit, and to prevent the minimum on-time from becoming too long with respect to the secondary side conducting period to cause a reverse current to flow.

To achieve at least one of the abovementioned objects, according to an aspect of the present invention, a switching power supply device includes:

a transformer for voltage conversion;

a synchronous rectification MOS transistor connected in series to a secondary side coil of the transformer;

a secondary side control circuit that performs on/off control of the synchronous rectification MOS transistor based on a drain voltage of the synchronous rectification MOS transistor; and a minimum on-time setting circuit that sets a minimum on-time when turning on the synchronous rectification MOS transistor based on a peak period and a bottom period detected by the secondary side control circuit.

Preferably, the secondary side control circuit includes:

a peak period detection circuit that detects a peak period of the drain voltage of the synchronous rectification MOS transistor; and a bottom period detection circuit that detects a bottom period of the drain voltage of the synchronous rectification MOS transistor, and the minimum on-time setting circuit sets the minimum on-time at turn-on of the synchronous rectification MOS transistor based on the peak period detected by the peak period detection circuit and the bottom period detected by the bottom period detection circuit.

According to the switching power supply device configured as described above, the minimum on-time is set on the basis of the peak period and the bottom period. Thus, even if the peak value and the peak width of the drain voltage change in accordance with increase/decrease of an input voltage, an influence of the input voltage is restrained, and the minimum on-time is settled in agreement with the magnitude of a load. Even if the primary side is suddenly turned off because of an influence of noise or the like to shorten the primary side conducting period and also shorten the secondary side conducting period, the minimum on-time is prevented from becoming longer than the secondary side conducting period to cause a reverse current to flow as in the system of setting the minimum on-time on the basis of the secondary side conducting period. Further, the function of linearly detecting the drain voltage as required in the system of settling the minimum on-time utilizing a product of the peak width and the peak value of the drain voltage is not necessary. It is therefore possible to prevent the difficulty in achieving the circuit from increasing, and to prevent the minimum on-time from becoming too long with respect to the secondary side conducting period to cause a reverse current to flow.

Preferably, the minimum on-time setting circuit includes:

a minimum on-time setting reference voltage generation circuit that generates a setting reference voltage in accordance with the peak period and the bottom period having been detected;

an adjustment signal generation circuit that generates an adjustment signal in accordance with a ratio between the peak period and the bottom period having been detected; and a minimum on-time signal generation circuit that generates a minimum on-time signal equivalent to the minimum on-time in accordance with the setting reference voltage generated by the minimum on-time setting reference voltage generation circuit and with the adjustment signal generated by the adjustment signal generation circuit.

Preferably, the minimum on-time setting reference voltage generation circuit, the adjustment signal generation circuit, and the minimum on-time signal generation circuit generate the setting reference voltage, the adjustment signal, and the minimum on-time signal, respectively, for each switching cycle of the synchronous rectification MOS transistor.

According to this configuration, the setting reference voltage, the adjustment signal, and the minimum on-time signal are generated for each cycle. It is therefore possible to prevent the minimum on-time on the secondary side from departing significantly from an optimum value in such a case where a behavior on the primary side has changed suddenly and significantly.

Preferably, the adjustment signal generation circuit generates the adjustment signal in a case where the ratio between the peak period and the bottom period having been detected is larger than or equal to a predetermined value, and the minimum on-time signal generation circuit generates the minimum on-time signal adjusted so as to make the minimum on-time shorter when the adjustment signal is received.

According to this configuration, the minimum on-time is adjusted to be shorter when the adjustment signal is received. It is therefore possible to prevent the minimum on-time from becoming long to cause a reverse current to flow in such an operation in a range departing from that of a normal operation in which an on-duty ratio between the primary side and the secondary side increases, or an operation in which the load is unstabilized or suddenly lightened.

Preferably, the switching power supply device further includes:

a sample-and-hold circuit that captures and holds the setting reference voltage for each switching cycle; and a voltage difference determination circuit that determines a difference between the setting reference voltage and a reference voltage in an immediately preceding cycle, wherein the minimum on-time signal generation circuit generates the minimum on-time signal adjusted so as to make the minimum on-time shorter in a case where the difference from the reference voltage in the immediately preceding cycle is larger than a predetermined value.

According to this configuration, the minimum on-time on the secondary side is prevented from departing significantly from an optimum value in such a case where a behavior on the primary side has changed suddenly and significantly. Since the minimum on-time is adjusted to be shorter, it is possible to prevent the minimum on-time from becoming long in an abnormal operation to cause a reverse current to flow.

Preferably, the switching power supply device further includes:

a gate driver circuit that includes a source side switch and a sync side switch, and generates a gate drive voltage for performing on/off control of the synchronous rectification MOS transistor;

an off-timing detection circuit that detects a timing for turning off the synchronous rectification MOS transistor based on the drain voltage of the synchronous rectification MOS transistor;

an on-timing detection circuit that detects a timing for turning on the synchronous rectification MOS transistor based on the drain voltage; and an on/off control circuit that generates a control signal for performing on/off control of the synchronous rectification MOS transistor based on a detection signal of the off-timing detection circuit, a detection signal of the on-timing detection circuit, and the minimum on-time signal, wherein the on/off control circuit turns off the source side switch of the gate driver circuit when the minimum on-time indicated by the minimum on-time signal elapses.

According to this configuration, by turning off the source side switch earlier when the minimum on-time elapses, a waiting time for a dead time for preventing the source side switch and the sync side switch from being turned on at the same time is shortened, and turn-off of the synchronous rectification MOS transistor is accelerated.

According to the present invention, in a switching power supply device including a secondary side synchronous rectification switching element, even if the peak value and the peak width of the drain voltage change in accordance with a change in an input voltage, an influence of the input voltage is restrained, and the minimum on-time is settled in agreement with the magnitude of a load. In such a case where a behavior on the primary side has changed suddenly and significantly, the minimum on-time on the secondary side is prevented from departing significantly from an optimum value. Further, there are effects that a circuit for linearly detecting the drain voltage is not necessary, that is, the difficulty in achieving the circuit is low, and the minimum on-time is prevented from becoming too long with respect to the secondary side conducting period to cause a reverse current to flow.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE PREFERRED EMBODIMENT

Hereinafter, one or more embodiments of the present invention will be described with reference to the drawings. However, the scope of the invention is not limited to the disclosed embodiments.

Figure 1:
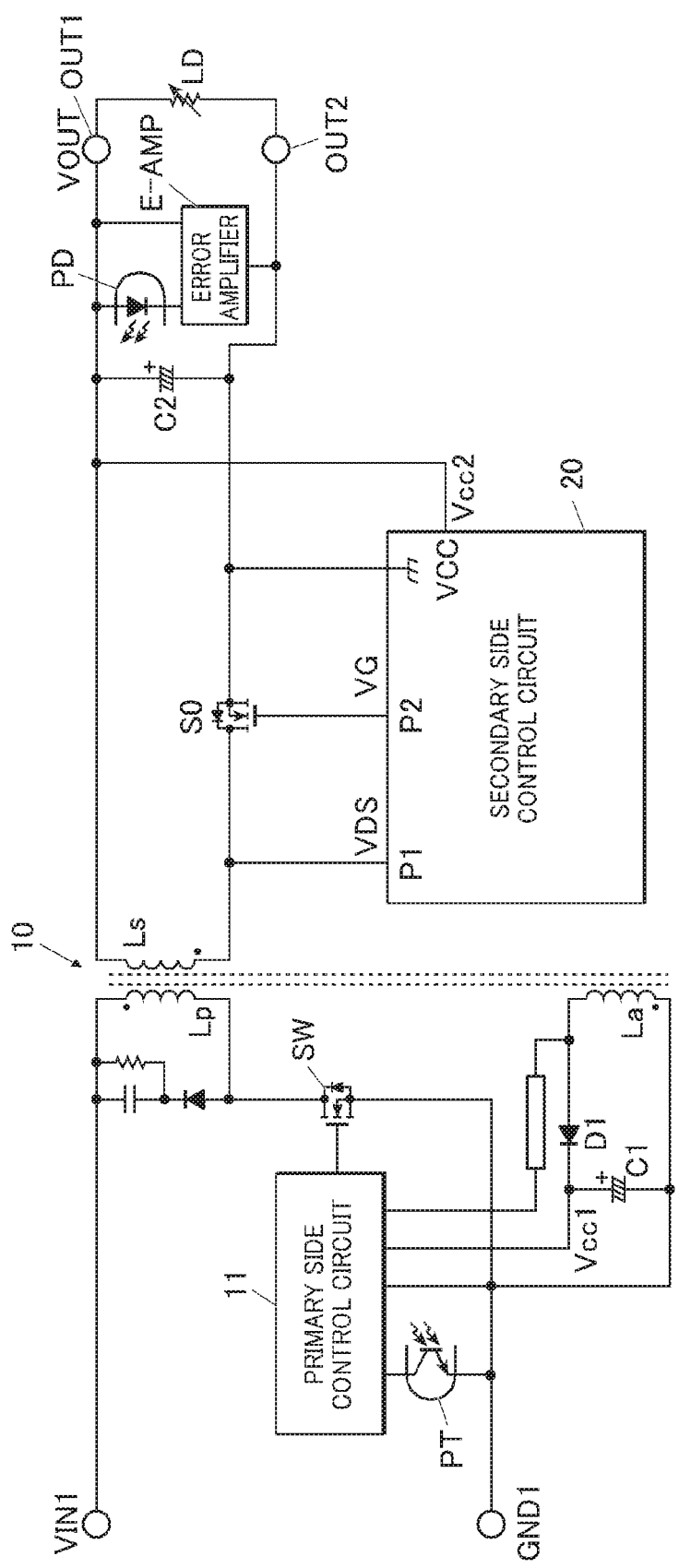
FIG. 1 is a circuit configuration diagram showing a configuration example of a switching power supply device of a secondary side synchronous rectification system which is effective by the application of the present invention.

FIG. 1 shows an embodiment of a switching power supply device of a synchronous rectification system to which the present invention has been applied.

The switching power supply device in the present embodiment is configured as an insulated DC-DC converter including:

a transformer 10 for voltage conversion having a primary side coil Lp, a secondary side coil Ls, and an auxiliary winding La;

a switching element SW including an N-channel MOS transistor and a control circuit (primary side control circuit) 11 therefor on the primary side of the transformer 10; and a MOS transistor S0 serving as a synchronous rectification element and a control circuit (secondary side control circuit) 20 therefor on the secondary side.

In this embodiment, the secondary side coil Ls having a polarity opposite to that of the primary side coil Lp is used in the transformer 10, and the transformer 10 is configured to operate as a flyback converter.

The switching element SW on the primary side is connected in series to the primary side coil Lp of the transformer 10. The primary side control circuit 11 and the secondary side control circuit 20 are each configured as a semiconductor integrated circuit (IC) on a single semiconductor chip, or as a semiconductor device mounted in a single package. A diode D1 and a capacitor C1 are connected in series between the terminals of the auxiliary winding La of the transformer 10. A voltage induced in the auxiliary winding La is rectified by the diode D1 and smoothed by the capacitor C1, so that a power supply voltage Vcc1 for the primary side control circuit 11 is generated and supplied to a power supply terminal of the primary side control circuit 11.

The DC-DC converter of this embodiment also includes a phototransistor PT for receiving light, which is connected to the primary side control circuit 11 and receives a feedback signal from the secondary side circuit. The primary side control circuit 11 is configured to change a switching frequency or a duty ratio of the switching element SW in accordance with the feedback signal to be adaptable to variations in load and input voltage.

On the secondary side of the transformer 10, the DC-DC converter includes:

the synchronous rectification MOS transistor S0 connected between one terminal of the secondary side coil Ls and an output terminal OUT2;

the secondary side control circuit 20 that detects a drain voltage of the synchronous rectification MOS transistor S0 using a voltage generated on the secondary side as a power supply voltage to generate an on/off control signal for the transistor S0; and a smoothing capacitor C2 connected between an output terminal OUT1 and the output terminal OUT2 to stabilize an output voltage VOUT.

The synchronous rectification MOS transistor S0 and the secondary side control circuit 20 may be integrated into a single package. A variable resistance LD connected between the output terminals OUT1 and OUT 2 represents an example of a load or equivalently describes a load.

A power supply terminal VCC of the secondary side control circuit 20 is connected to the output terminal OUT1, and an output voltage VOUT is supplied to the secondary side control circuit 20 as a power supply voltage Vcc2. The voltage induced in the auxiliary winding of the transformer 10 may be rectified and supplied as the power supply voltage for the secondary side control circuit 20.

On the secondary side of the transformer 10, a photodiode PD for feedback and an error amplifier E-AMP are connected between the output terminals OUT1 and OUT2. The error amplifier E-AMP is configured such that a current in proportion to the level of the output voltage VOUT flows in the photodiode PD.

The photodiode PD on the secondary side and the phototransistor PT on the primary side constitute a photointerrupter serving as an insulated signal transmitter. Light emitted from the photodiode PD on the secondary side is received by the phototransistor PT on the primary side, and a feedback signal in accordance with the intensity of light is generated. The primary side control circuit 11 controls the switching element SW in accordance with this feedback signal.

The secondary side control circuit 20 monitors a voltage VDS at an external terminal (drain voltage detection terminal) P1 connected via a wiring to a drain terminal of the synchronous rectification MOS transistor S0 serving as a secondary side switching element, and generates a control signal (gate drive voltage) VG for turning on or off the synchronous rectification MOS transistor S0 at a predetermined timing, and outputs the control signal VG to a gate terminal of the transistor S0 through the external terminal P2.

Figure 2:
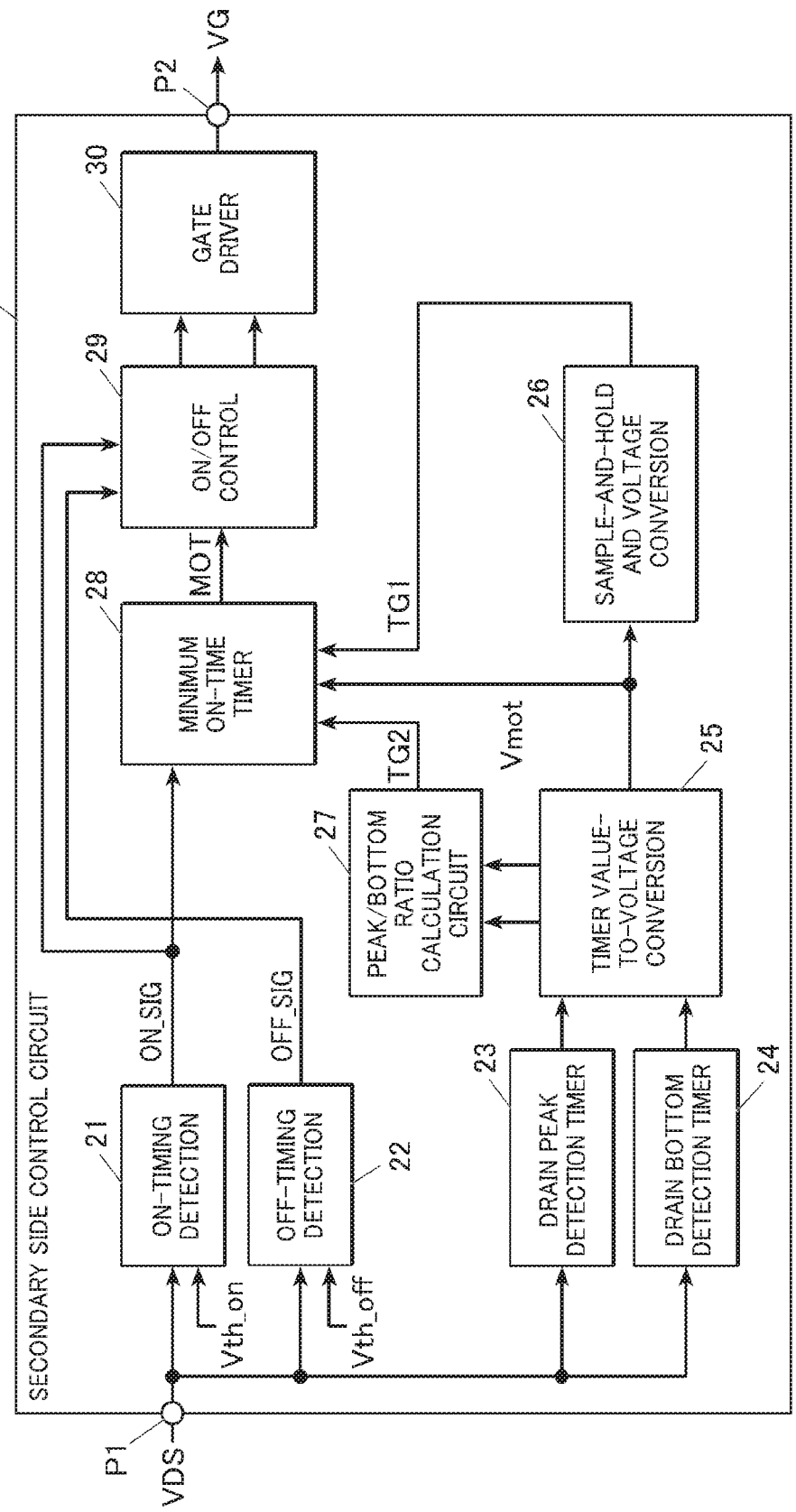
FIG. 2 is a block diagram showing a configuration example of a secondary side control circuit that constitutes the switching power supply device according to the embodiment.

FIG. 2 shows a configuration example of the secondary side control circuit 20.

As shown in FIG. 2, the secondary side control circuit 20 includes:

an on-timing detection circuit 21 including a comparator that compares the voltage VDS of the drain voltage detection terminal P1 to which the drain terminal of the synchronous rectification MOS transistor S0 is connected and a predetermined threshold voltage Vth_on (for example, −200 mV) and the like; and an off-timing detection circuit 22 including a comparator that compares the voltage VDS of the drain voltage detection terminal P1 and a predetermined threshold voltage Vth_off (for example, 0 to −150 mV) and the like.

The determination threshold value Vth_on of the on-timing detection circuit 21 is set at a voltage taking into consideration a forward voltage of a body diode of the synchronous rectification MOS transistor S0 such that it is reliably detected that a current starts flowing into the body diode.

The secondary side control circuit 20 also includes:

a peak period detection timer circuit 23 that detects a peak period Tp (see FIG. 3) of the drain voltage VDS;

a bottom period detection timer circuit 24 that detects a bottom period Tb of the drain voltage VDS; and a timer value-to-voltage conversion circuit 25 that converts timer values detected by these timer circuits 23 and 24 into a voltage (MOT determination reference voltage).

By using a charging type analog timer including a constant current source and a capacitor, for example, for the timer circuits 23 and 24, it is also possible to configure the timer circuits 23, 24 and the timer value-to-voltage conversion circuit 25 as an integral circuit.

The secondary side control circuit 20 further includes:

a sample-and-hold and voltage conversion circuit 26 that captures and holds an output voltage (minimum on-time setting reference voltage: a MOT threshold value Vmot1) of the timer value-to-voltage conversion circuit 25 in an immediately preceding cycle, and compares the output voltage with an output voltage (a MOT threshold value Vmot2) of the timer value-to-voltage conversion circuit 25 in the current cycle;

a peak-to-bottom ratio calculation circuit 27 that calculates a ratio between the drain peak period Tp and the drain bottom period Tb; and a MOT timer 28 that measures the minimum on-time on the basis of the output of the peak-to-bottom ratio calculation circuit 27 and the like.

When the difference between the MOT threshold value in an immediately preceding cycle and the MOT threshold value in the current cycle is larger than or equal to a predetermined value, the sample-and-hold and voltage conversion circuit 26 generates and outputs a signal TG1 for shortening the pulse width of an output of the MOT timer 28. The sample-and-hold and voltage conversion circuit 26 also generates a voltage (MOT threshold value) Vmot in accordance with the drain peak period Tp and the drain bottom period Tb, and supplies the generated voltage to the MOT timer 28. The MOT timer 28 measures a time in accordance with this MOT threshold value Vmot to output a minimum on-time signal (pulse) MOT having a pulse width in accordance with Tp and Tb. Specifically, as Tp and Tb have larger numeric values, the pulse width of the minimum on-time signal MOT is wider, and as Tp and Tb have smaller numeric values, the pulse width of the minimum on-time signal MOT is narrower.

The secondary side control circuit 20 further includes:

an on/off control circuit 29 that generates a signal for performing on/off control of the synchronous rectification MOS transistor S0 on the basis of an output ON_SIG of the on-timing detection circuit 21, an output OFF_SIG of the off-timing detection circuit 22, and the output MOT of the MOT timer 28; and a gate driver circuit 30 that receives the generated on/off control signal and outputs the gate drive voltage VG through the external terminal P2.

The on/off control circuit 29 includes a logic circuit (for example, AND gate) that masks the off-timing detection signal OFF_SIG with the output MOT of the MOT timer 28, an RS flip flop, and the like, and generates a control signal for, when the output signal ON_SIG of the on-timing detection circuit 21 rises, changing the gate drive voltage VG to the high level to turn on the synchronous rectification MOS transistor S0, and at the timing of the output signal OFF_SIG of the off-timing detection circuit 22, changing the gate drive voltage VG to the low level to turn off S0. At this time, the OFF_SIG signal is masked with the minimum on-time signal MOT output from the MOT timer 28 to disable input to the on/off control circuit 29, so that the MOS transistor S0 is prevented from being turned off in a MOT period to degrade the efficiency.

Figure 3:
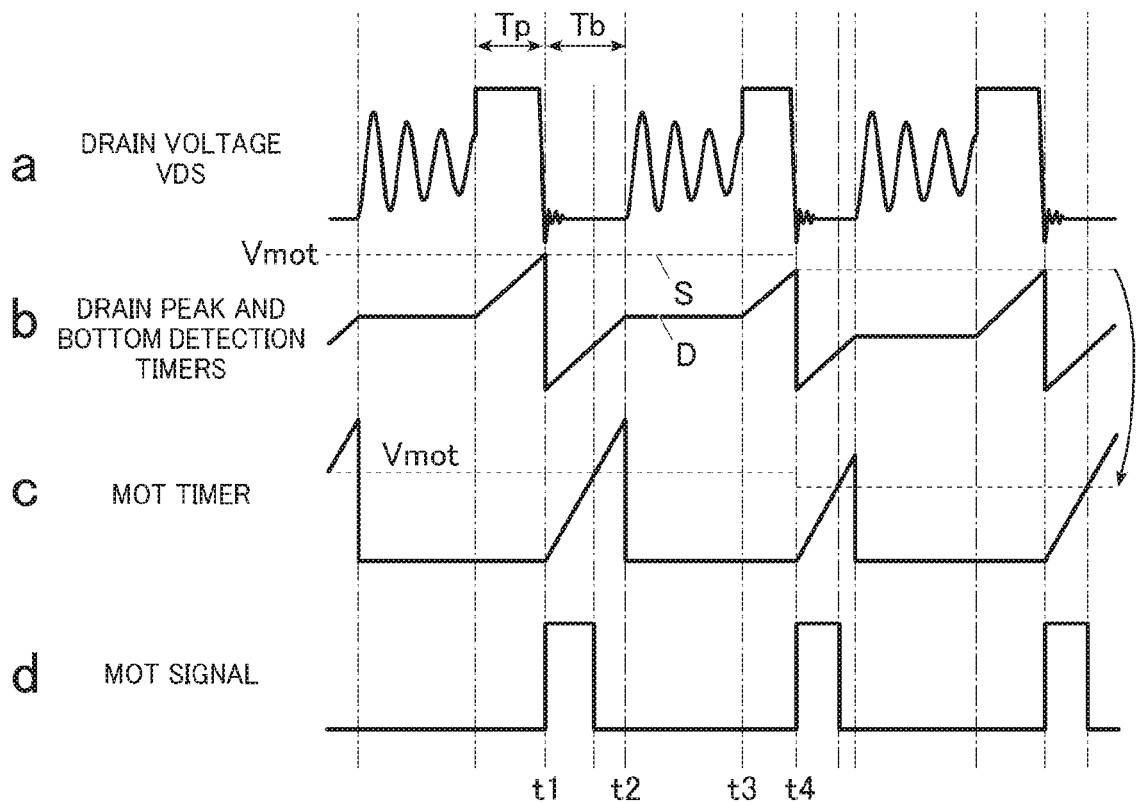
FIG. 3 is a waveform diagram for describing functions of a timer value-to-voltage conversion circuit and a MOT (minimum on-time) timer in the secondary side control circuit according to the embodiment.

Next, the operation of the secondary side control circuit 20 will be described with reference to FIG. 3 to FIG. 5. FIG. 3 is a waveform diagram for describing functions of the timer value-to-voltage conversion circuit 25 and the MOT timer 28, and FIG. 4 is a waveform diagram for describing functions of the sample-and-hold and voltage conversion circuit 26 and the MOT timer 28.

Figure 4:
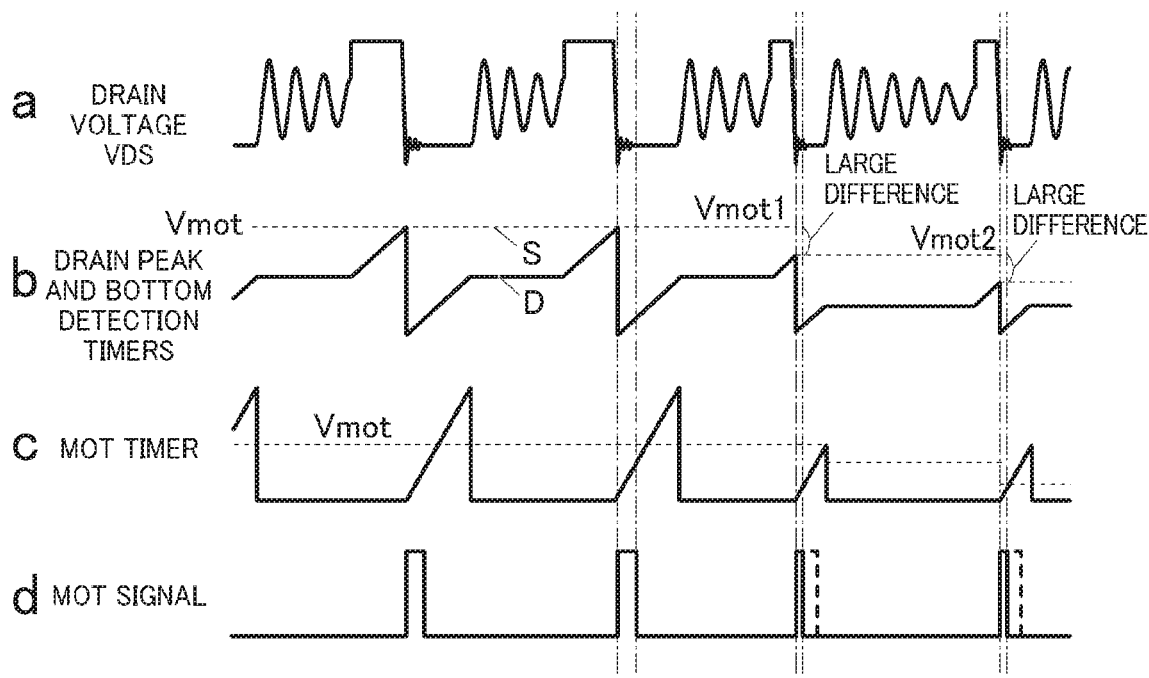
FIG. 4 is a waveform diagram for describing functions of a sample-and-hold and voltage conversion circuit and the MOT timer in the secondary side control circuit according to the embodiment.
Figure 5:
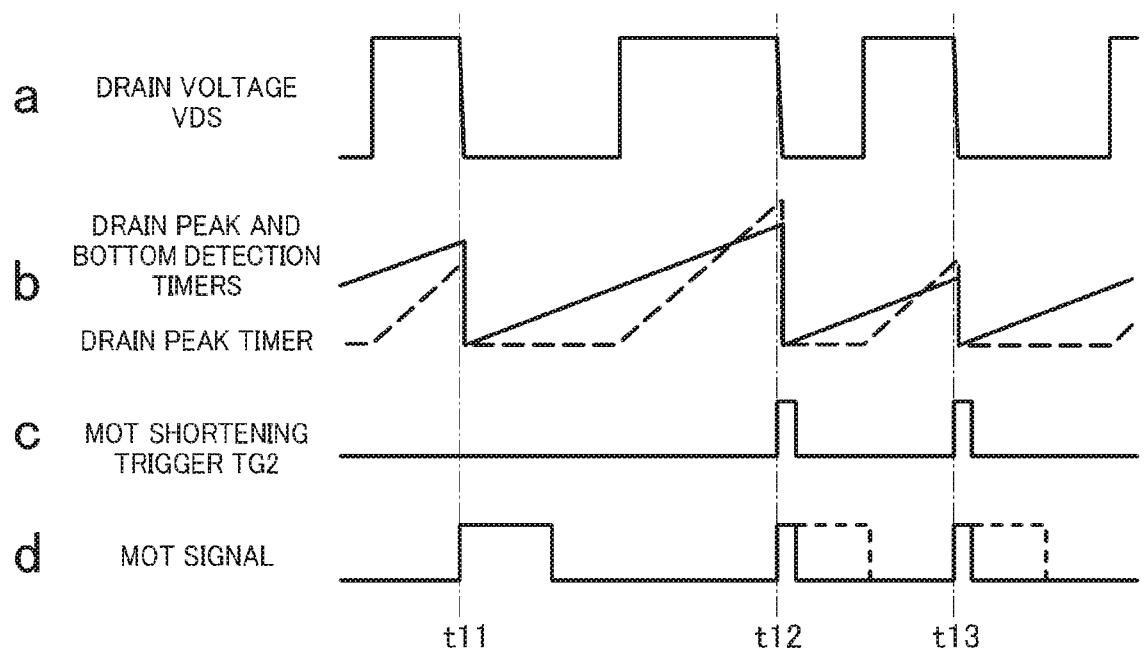
FIG. 5 is a waveform diagram for describing functions of a peak-to-bottom ratio calculation circuit in the secondary side control circuit according to the embodiment.

In FIG. 3 and FIG. 4, the drain voltage VDS of the synchronous rectification MOS transistor S0 is shown at (a). The MOT threshold value Vmot generated as a voltage obtained by converting timer values representing the peak period Tp and the bottom period Tb of the drain voltage VDS is shown at (b). A timer value of the MOT timer 28 is shown at (c). A change in the output (minimum on-time signal) MOT of the MOT timer 28 is shown at (d). At (b) in FIG. 3, a solid line D indicates the value of the timer, and a broken line S indicates a voltage generated by sampling the solid line D at certain timings. This voltage is supplied to the MOT timer 28 as the MOT threshold value Vmot.

As shown at (b) in FIG. 3, the timer value (the solid line D) repeats a change of falling (resetting) at a turn-on timing t1 when the peak period Tp of the drain voltage VDS shown at (a) ends, rising in the bottom period Tb (t1 to t2) of VDS, maintaining an identical value in a period in which VDS is not at the peak or the bottom, such as a current discontinuous period, and then rising to a next turn-on timing t4. When the sum of the peak period Tp and the bottom period Tb decreases in this process, the peak value Vmot of the timer is reduced as indicated by the broken line S at (b) in FIG. 3.

When the MOT threshold value Vmot is reduced, the time until the timer value of the MOT timer 28 reaches the threshold value Vmot is shortened as indicated at (c) in FIG. 3, and the pulse width of the minimum on-time signal MOT output from the MOT timer 28 is narrowed as indicated at (d) in FIG. 3.

As described above, by adjusting the pulse width of the minimum on-time signal MOT in accordance with both the length of the peak period Tp and the length of the bottom period Tb of the drain voltage VDS, the influence of an input voltage is restrained, and an appropriate minimum on-time is settled in agreement with the magnitude of a load even if the peak value and the peak width of the drain voltage change in proportion to the input voltage. Thus, a phenomenon in which the minimum on-time is too long and a reverse current flows is prevented from occurring. In FIG. 3 and FIG. 4, a waveform in the period from t2 to t3 of the drain voltage VDS shown at (a) is a waveform obtained by resonance occurring in a current discontinuous mode at a light load.

In the secondary side control circuit 20 according to the present embodiment, when the difference between the MOT threshold value Vmot1 in an immediately preceding cycle sampled in the sample-and-hold and voltage conversion circuit 26 and the MOT threshold value Vmot2 in the current cycle is larger than or equal to a predetermined value as shown in FIG. 4, a shortening trigger pulse TG1 is output from the sample-and-hold and voltage conversion circuit 26 to the MOT timer 28 to reduce the pulse width of the minimum on-time signal MOT.

Then, falling of the minimum on-time signal MOT output from the MOT timer 28 that originally changes to the low level at a point of time when the timer value of the MOT timer 28 reaches the threshold value Vmot as indicated by the dotted lines at (d) in FIG. 4 is expedited as indicated by solid line.

By adjusting the pulse width of the minimum on-time signal MOT as described above, the minimum on-time on the secondary side is prevented from departing significantly from an optimum value in such a case where a behavior on the primary side has changed suddenly and significantly.

Next, functions of the peak-to-bottom ratio calculation circuit 27 and the MOT timer 28 will be described with reference to FIG. 5. In FIG. 5, a waveform obtained by simplifying the drain voltage VDS of the synchronous rectification MOS transistor S0 is shown at (a). How the value (dotted lines) of the timer that detects the peak period Tp of the drain voltage VDS in the peak-to-bottom ratio calculation circuit 27 and the value (solid line) of the timer that detects the peak period Tp and the bottom period Tb, that is, Tp+Tb, change is shown at (b). A signal (pulse) output from the peak-to-bottom ratio calculation circuit 27 is shown at (c). The signal (pulse) shown at (c) in FIG. 5 is supplied to the MOT timer 28 as a shortening trigger pulse TG2. In FIG. 5, the operation of the MOT timer 28 when the shortening trigger pulse TG2 is supplied is shown at (d).

The peak-to-bottom ratio calculation circuit 27 is provided with the timer that detects the peak period Tp separately from the timer that detects Tp+Tb, and the time is weighted by changing the inclination of the timer value. In a case where the timer includes a constant current source and a capacitor, for example, the inclination of the timer value can be changed by varying the current value of the constant current source. Both the timer values are compared at timings (t11, t12, and t13 in FIG. 5) when the peak period Tp of the drain voltage VDS ends, and when "Timer value in Tp>Timer value in (Tp+Tb)" holds, the trigger pulse TG2 (FIG. 5 (c)) for shortening the minimum on-time signal MOT for the next cycle is generated and output.

Accordingly, the ratio between the timer value in the peak period Tp of the drain voltage VDS and the timer value in the bottom period Tb is calculated, and in a case where the timer value in the peak period Tp is larger than the timer value in the bottom period Tb by more than or equal to a predetermined value, the shortening trigger pulse TG2 can be output.

Then, in such a case where a load on the secondary side changes significantly, for example, by adjusting the pulse width of the minimum on-time signal MOT as described above to cause the ratio between the peak period Tp and the bottom period Tb to change significantly, the minimum on-time on the secondary side is prevented from departing significantly from an optimum value.

Figure 6:
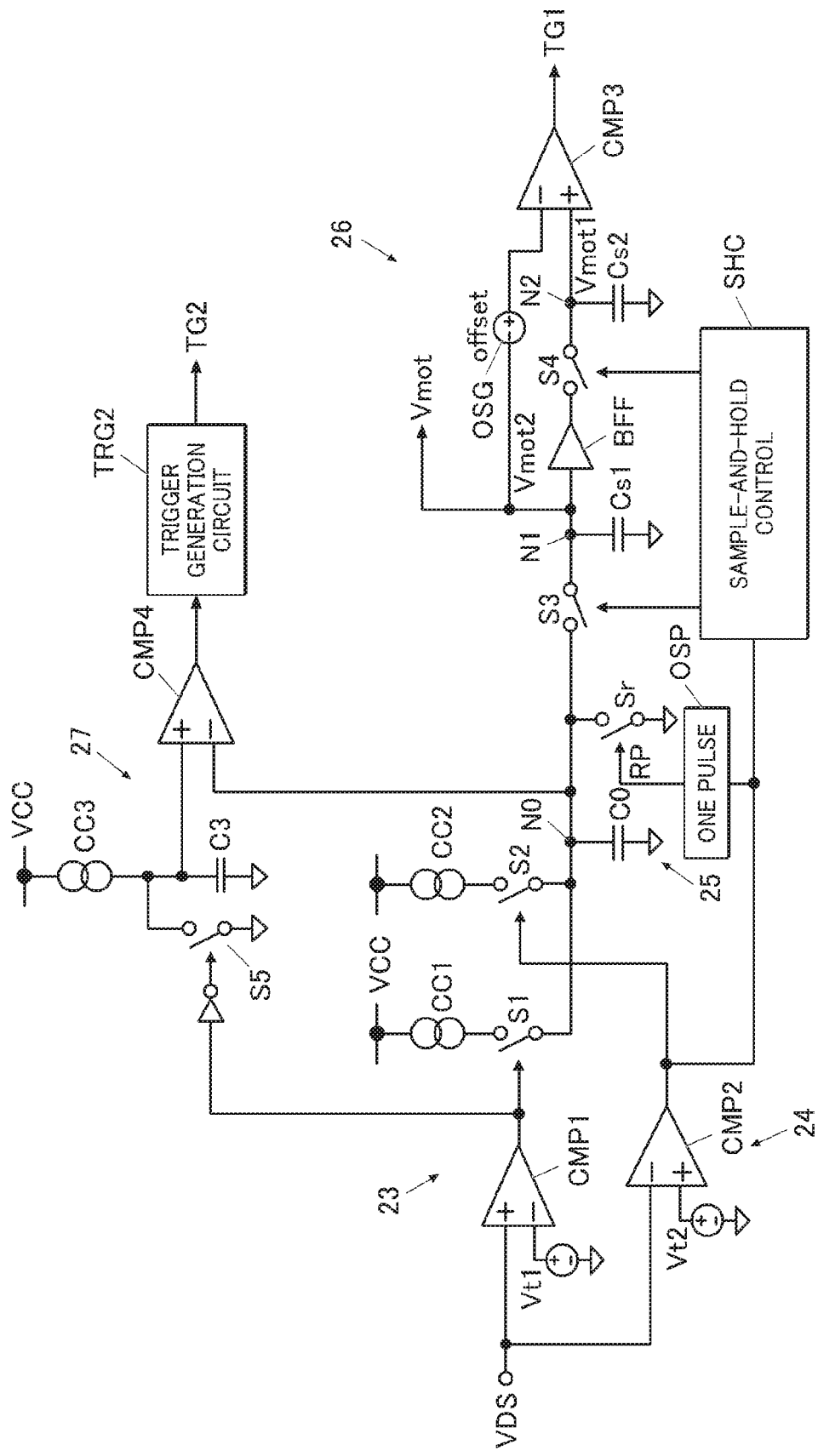
FIG. 6 is a circuit configuration diagram showing a specific example of timers that detect a peak period and a bottom period, a timer value-to-voltage conversion circuit, a sample-and-hold and voltage conversion circuit, and a peak-to-bottom ratio calculation circuit that constitute the secondary side control circuit according to the embodiment.

FIG. 6 shows a specific circuit example of the peak period detection timer circuit 23, the bottom period detection timer circuit 24, the timer value-to-voltage conversion circuit 25, the sample-and-hold and voltage conversion circuit 26, and the peak-to-bottom ratio calculation circuit 27 constituting the secondary side control circuit 20.

The peak period detection timer circuit 23 includes, as shown in FIG. 6, a comparator CMP1 that compares the drain voltage VDS and a predetermined threshold voltage Vt1 to detect a starting point of a peak period, a constant current source CC1 connected in series between the power supply voltage terminal VCC and a ground point, a switch S1, and a capacitor C0. The bottom period detection timer circuit 24 includes a comparator CMP2 that compares the drain voltage VDS and a predetermined threshold voltage Vt2 to detect a starting point of a bottom period, a constant current source CC2 connected in series between the power supply voltage terminal VCC and the ground point, a switch S2, and the capacitor C0. The capacitor C0 functions as the timer value-to-voltage conversion circuit 25. A switch Sr for resetting that discharges accumulated charges in the capacitor C0 is connected in parallel to the capacitor C0, and a one-shot pulse generation circuit OSP that generates a reset pulse RP for turning on the switch Sr in synchronization with the falling of an output signal of the comparator CMP2 to discharge accumulated charges in the capacitor C0 is provided.

In the present embodiment as described above, the peak period detection timer circuit 23, the bottom period detection timer circuit 24, and the timer value-to-voltage conversion circuit 25 are configured as an integral circuit having a capacitor (C0) in common.

The sample-and-hold and voltage conversion circuit 26 includes:

a capacitor Cs1, a sampling switch S3 connected between a charging node N1 of the capacitor Cs1 and a charging node N0 of the above-described capacitor C0, a buffer BFF that performs impedance conversion on a charging voltage of the capacitor Cs1 and transmits the voltage to a later stage, a capacitor Cs2 for holding the transmitted voltage, a holding switch S4 connected between the buffer BFF and a charging node N2 of the capacitor Cs2; and a sample-and-hold control circuit SHC that generates a signal for turning on/off the above-described switches S3 and S4.

The sample-and-hold and voltage conversion circuit 26 further includes:

a comparator CMP3 that receives the voltage held in the above-described capacitor Cs2 at one input terminal (+); and an offset provider OSG that inputs a voltage obtained by providing the charging voltage of the capacitor Cs1 with a predetermined offset to the other input terminal (−) of the comparator CMP3.

When a difference between a voltage in an immediately preceding cycle held in the capacitor Cs2 and a voltage in the current cycle captured into the capacitor Cs1 is larger than or equal to the above-described offset, the comparator CMP3 outputs the shortening trigger pulse TG1 to the MOT timer 28. The voltage held in the above-described capacitor Cs1 is supplied to the MOT timer 28 as the MOT threshold value Vmot.

The peak-to-bottom ratio calculation circuit 27 includes:

a constant current source CC3 and a capacitor C3 connected in series between the power supply voltage terminal VCC and the ground point;

a reset switch S5 connected in parallel with the capacitor C3;

a comparator CMP4 that compares the charging voltage of the capacitor C3 and the charging voltage of the capacitor C0 of the timer value-to-voltage conversion circuit 25; and a trigger pulse generation circuit TRG2 that converts an output of CMP4 into an input signal (pulse) for the MOT timer 28.

The current value of the constant current source CC3 is set at a value larger than the current values of the constant current sources CC1 and CC2, and the switch S5 is controlled by a signal obtained by inverting the output of the comparator CMP1 of the peak period detection timer circuit 23. Accordingly, the capacitor C3 is charged with the current of the constant current source CC3 only for the peak period Tp of the drain voltage VDS.

On the other hand, the capacitor C0 of the timer value-to-voltage conversion circuit 25 is charged throughout the period of (Tp+Tb) which is the sum of the peak period Tp and the bottom period Tb of the drain voltage VDS.

Thus, the comparator CMP4 of the peak-to-bottom ratio calculation circuit 27 can determine whether the relation of "Timer value in Tp>Timer value in (Tp+Tb)" holds.

When the relation of the above-described inequality holds, the comparator CMP4 outputs the shortening trigger pulse TG2 to the MOT timer 28 via the trigger pulse generation circuit TRG2. The trigger pulse generation circuit TRG2 determines the output of the comparator CMP4, and generates the shortening trigger pulse TG2 in agreement with the timing at which the MOT timer 28 operates. By providing a device that provides an inverting input terminal of the comparator CMP4 with a predetermined offset, the shortening trigger pulse TG2 may be output when the peak period Tp is longer than the bottom period Tb by more than or equal to a predetermined value.

Figure 7:
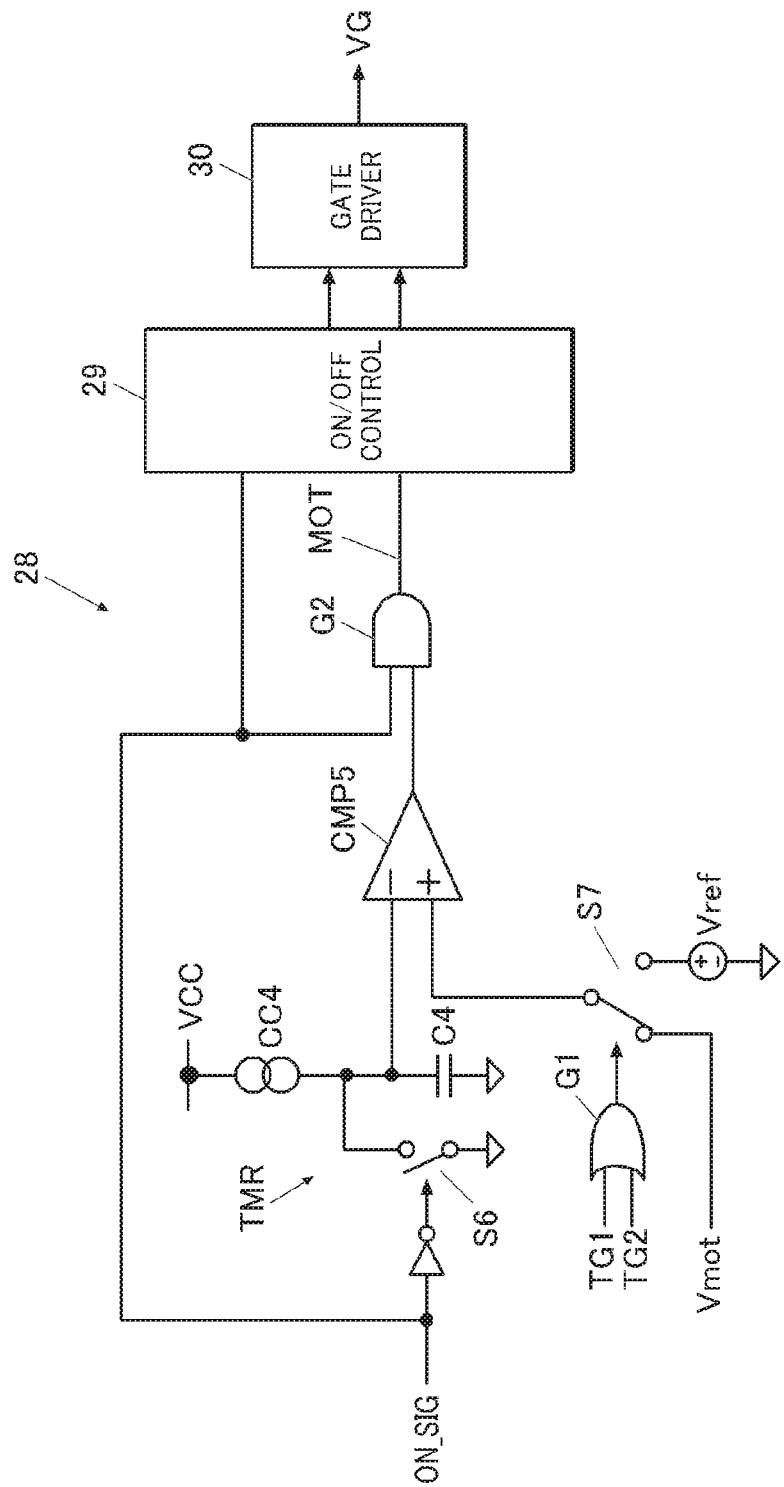
FIG. 7 is a circuit configuration diagram showing a specific example of the MOT timer that constitutes the secondary side control circuit according to the embodiment.

FIG. 7 shows a specific circuit example of the MOT timer 28 constituting the secondary side control circuit 20.

As shown in FIG. 7, the MOT timer 28 includes:

a constant current source CC4 and a capacitor C4 connected in series between the power supply voltage terminal VCC and the ground point; and a timer circuit TMR including a reset switch S6 connected in parallel with the capacitor C4.

On/off control of the switch S6 is performed by a signal obtained by inverting the detection signal ON_SIG from the on-timing detection circuit 21. Accordingly, the timer circuit TMR charges the capacitor C4 with the current of the constant current source CC4 only for a period in which the on-timing detection signal ON_SIG is at the high level to output a timer value equivalent to a period in which the synchronous rectification MOS transistor S0 should be turned on.

The MOT timer 28 also includes:

an OR gate G1 that calculates a logical sum of the shortening trigger pulse TG1 from the sample-and-hold and voltage conversion circuit 26 and the shortening trigger pulse TG2 from the peak-to-bottom ratio calculation circuit 27;

a selector switch S7 for selecting either the MOT threshold value Vmot from the sample-and-hold and voltage conversion circuit 26 or a predetermined reference voltage Vref lower than Vmot in accordance with an output of the OR gate G1;

a comparator CMP5 that compares the selected voltage and the charging voltage of the capacitor C4 of the timer circuit TMR; and an AND gate G2 that receives, as inputs, the detection signal ON_SIG from the on-timing detection circuit 21 and an output of the comparator CMP5.

An output of the AND gate G2 is supplied to the on/off control circuit 29 in the later stage as the minimum on-time signal MOT. An AND gate that receives, as inputs, a signal obtained by inverting the output of the AND gate G2 and the detection signal OFF_SIG from the on-timing detection circuit 21 may be provided to supply the output of this AND gate to the on/off control circuit 29.

FIG. 8 shows a specific circuit example of the on/off control circuit 29 and the gate driver circuit 30 constituting the secondary side control circuit 20.

Figure 8A:
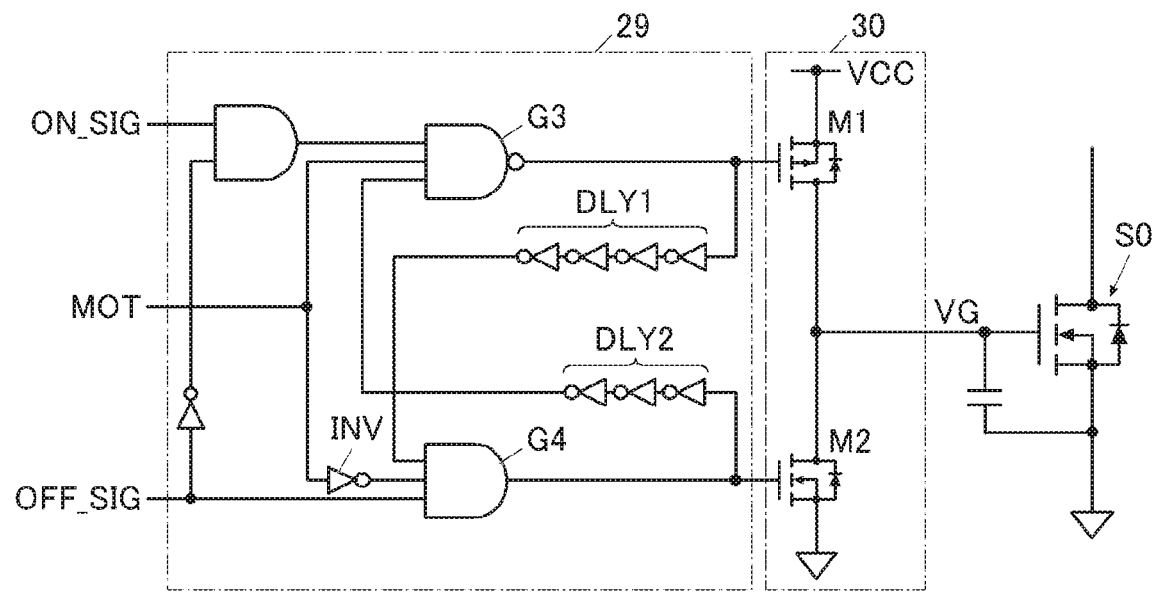
FIG. 8A is a circuit configuration diagram showing a specific example of an on/off control circuit that constitutes the secondary side control circuit according to the embodiment.

As shown in FIG. 8A, the gate driver circuit 30 includes a P-channel MOS transistor M1 and an N-channel MOS transistor M2 connected in series between the power supply voltage terminal VCC and a ground point GND. The gate terminal of the synchronous rectification MOS transistor S0 is connected to a connection node between M1 and M2.

The on/off control circuit 29 includes:

a three input NAND gate G3 that receives, as inputs, the output ON_SIG of the on-timing detection circuit 21 and the minimum on-time signal MOT from the MOT timer 28; and a three input AND gate G4 that receives, as inputs, the output OFF_SIG of the off-timing detection circuit 22 and a signal obtained by inverting the minimum on-time signal MOT from the MOT timer 28 in an inverter INV.

An output signal of the inverter INV functions as a mask signal that disables input of the output OFF_SIG of the off-timing detection circuit 22.

The on/off control circuit 29 also includes delay circuits DLY1 and DLY2 including series inverter strings that delay outputs of the NAND gate G3 and the AND gate G4, respectively. A signal delayed by the delay circuit DLY1 is fed back to the AND gate G4, and a signal delayed by the delay circuit DLY2 is fed back to the NAND gate G3, respectively. Thus, a dead time for preventing a flow-through current from flowing through the MOS transistors M1 and M2 constituting the gate driver circuit 30 is provided.

In the on/off control circuit 29 according to the present embodiment, even if the off-timing detection signal OFF_SIG is input immediately after the source-side MOS transistor M1 is turned on by the on-timing detection signal ON_SIG, the off-timing detection signal OFF_SIG is masked by the AND gate G4 and the minimum on-time signal MOT. The source-side MOS transistor M1 is turned off when the minimum on-time elapses, so that the MOS transistors M1 and M2 on the source side and sync side are both turned off. Even if the MOS transistor M1 on the source side is turned off, the output voltage VG of the gate driver circuit 30 is maintained by a gate capacitance of the synchronous rectification MOS transistor S0, and S0 maintains the on state. Since the output of the delay circuit DLY1 is brought into the high level after a predetermined delay time, the three input AND gate G4 can turn on the sync side MOS transistor M2 in agreement with the off-timing detection signal OFF_SIG without waiting for a response from the delay circuit DLY1.

In a case where the source side transistor M1 is not turned off by the minimum on-time signal MOT, the synchronous rectification MOS transistor S0 is turned off by a flow of turning off the source side switch (M1), and then turning on the sync side switch (M2). At this time, a flow-through current that would be caused by turning on the source side and sync side switches at the same time is prevented by providing the dead time by the delay circuits DLY1 and DLY2. Thus, the sync side switch M2 can be turned on only after the source side switch M1 is turned off and the delay time provided by the delay circuit DLY1 elapses, so that turn-off of the synchronous rectification MOS transistor S0 is delayed.

In the on/off control circuit 29 according to the present embodiment, the time equivalent to the delay time provided by the delay circuit DLY1 is shortened by turning off the source side switch (M1) earlier at the point of time when the minimum on-time elapses, and the time from detection of the off-timing detection signal OFF_SIG to turn-off of the synchronous rectification MOS transistor S0 is shortened.

Figure 8B:
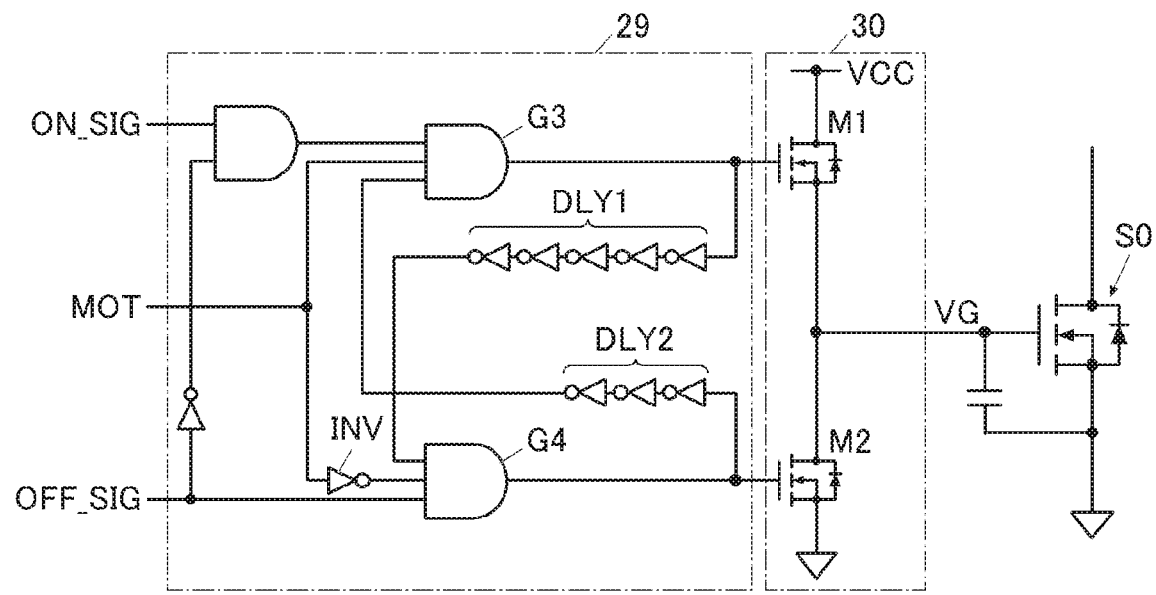
FIG. 8B is a circuit configuration diagram showing a specific example of the on/off control circuit that constitutes the secondary side control circuit according to the embodiment.
Figure 9:
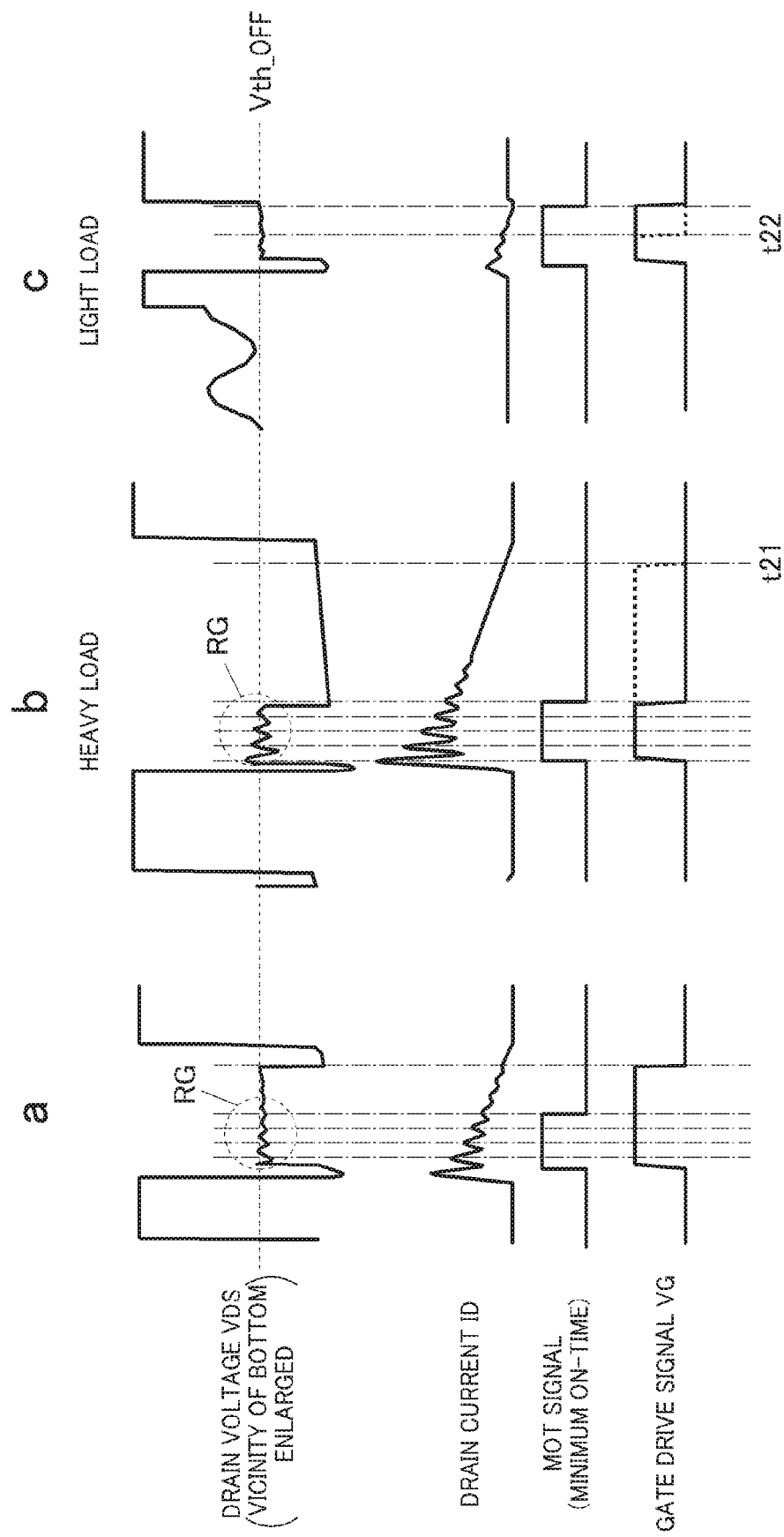
FIG. 9 is a waveform diagram showing a relation between timings at which a MOS transistor in a secondary side control circuit of a conventional synchronous rectification system is turned off and a fixed minimum on-time signal.

The on/off control circuit 29 is not limited to the configuration shown in FIG. 8A. A configuration in which the P-channel MOS transistor M1 of the gate driver circuit 30 has been replaced by an N-channel MOS transistor as shown in FIG. 8B, for example, produces similar effects. In this case, the configuration is achieved by replacing the three input NAND gate G3 in the on/off control circuit 29 shown in FIG. 8A by a three input AND gate and adding a stage of inverters to the delay circuit DLY1. Instead of adding a stage of inverters to the delay circuit DLY1, a stage of inverters may be reduced.

In the case of replacing the MOS transistor M1 by the N-channel MOS transistor in this manner, the maximum value of the gate drive voltage VG is limited to a value obtained by subtracting a threshold voltage of M1 from the gate voltage of the transistor M1. Thus, the upper limit of the gate drive voltage VG is easily clamped.

As described above, since the secondary side control circuit according to the above-described embodiment includes the MOT timer circuit 28 that sets the minimum on-time MOT on the basis of the peak period and the bottom period of the drain voltage VDS of the secondary side synchronous rectification MOS transistor S0, the minimum on-time whose optimum value varies depending on operating conditions of the power source device is adjusted automatically. Since the minimum on-time is set for each pulse (for each cycle), an operation at a transient time when the optimum minimum on-time changes significantly, such as when the power source device is started/stopped or a load varies, is followed promptly.

The secondary side operation includes a period in which switching is stopped and the drain voltage VDS takes an intermediate potential, such as a resonance period in a burst mode or when in a current discontinuous operation. In the secondary side control circuit according to the above-described embodiment, the drain voltage VDS in the switching stop period is removed by using only the peak period and the bottom period of the drain voltage VDS as a reference, so that the optimum minimum on-time is set. Although the peak period of the drain voltage VDS is influenced by an AC input voltage, the bottom period equivalent to the secondary side conducting period is not. Thus, the influence exerted by an AC input voltage is reduced by using both the peak period and the bottom period as a reference for setting the minimum on-time.

In the secondary side control circuit according to the above-described embodiment, the minimum on-time is adjusted considering the ratio between the peak period and the bottom period of the drain voltage VDS. Thus, the on-duty ratio between the primary side and the secondary side is calculated indirectly to adjust the minimum on-time. In a general insulated power source device, the on-duty ratio is approximately 0.5 at most, and in a case where the on-duty ratio is larger than or equal to 0.5, the minimum on-time needs to be set small for safety because the range falls out of that of a normal operation. In the above-described embodiment, such adjustment (shortening) of the minimum on-time is possible.

A specific example of a behavior to result in a large on-duty ratio includes the case of the PWM system, in which the on-duty ratio exceeds 0.5 when subharmonic oscillation has occurred. In this case, the conducting period on the secondary side becomes shorter, so that a reverse current flows if the minimum on-time is set long. In the case of the QR (flyback quasi-resonant) system, the on-duty ratio exceeds 0.5 when the input voltage is reduced. The switching frequency is also reduced because of the QR system, and a necessary minimum on-time becomes shorter when the load is light regardless of the state in which the sum of the peak period and the bottom period becomes longer and the minimum on-time takes a maximum value, so that a reverse current may be produced. In a case of an LLC system in which a resonance circuit including an inductor and a capacitor is provided on the primary side, a control operation is performed such that the on-duty ratio becomes 0.5, and thus, a state in which the on-duty ratio departs from 0.5 is in an abnormal state or when in a burst mode operation, and when the load is unstable or light. Thus, when the minimum on-time is made long in a case where the on-duty ratio becomes large, a reverse current may be produced.

In the secondary side control circuit according to the above-described embodiment, a set value of the minimum on-time is stored, and a comparison is made for each pulse (each cycle), and in a case where the amount of reduction of the minimum on-time is larger than a prescribed value, the minimum on-time is minimized. Thus, the minimum on-time is prevented from becoming longer than the secondary side conducting period because of a sudden reduction of a load, an abnormal operation, or the like to produce a reverse current.

In the secondary side control circuit according to the above-described embodiment, driving signals for the switches on the source (turn-on) side and the sync (turn-off) side of the gate driver that drives the secondary side synchronous rectification MOS transistor are separated, and at turn-off, the on state of the source side switch is canceled earlier after the minimum on-time elapses. In general, at turn-off, control is exerted in a flow of cancelling the on state of the source side switch, a dead time for preventing simultaneous turn-on, and activating the sync side switch. Turn-off of the synchronous rectification MOS transistor is accelerated by interrupting the source side switch earlier when the minimum on-time elapses as in the above-described embodiment.

Although the invention made by the inventors has been described specifically on the basis of an embodiment, the present invention is not limited to the aforementioned embodiment. For example, in the above-described embodiment, the peak-to-bottom ratio calculation circuit 27 makes a determination on the basis of the ratio between the peak period Tp of the drain voltage VDS and (Tp+Tb), whilst the peak period Tp and the bottom period Tb may be measured separately in the timer circuits 23, 24 and the timer value-to-voltage conversion circuit 25, and a determination may be made in the peak-to-bottom ratio calculation circuit 27 on the basis of the ratio between Tp and Tb.

In the above-described embodiment, the timer circuit that measures various periods is configured as an analog timer circuit including a constant current source and a capacitor, but may be configured as a digital timer circuit that counts clock signals of a predetermined frequency.

The secondary side synchronous rectification control circuit according to the present invention is not limited to the switching power supply device (DC-DC converter) of the flyback system as shown in FIG. 1, but may be applied to a DC-DC converter of another system such as a half-bridge system, for example. The secondary side synchronous rectification control circuit according to the present invention can also be applied to an LLC resonance converter in which a current resonance circuit including an inductor and a capacitor is provided on the primary side.

In a case of a DC-DC converter of a half-bridge quasi-resonant system having two synchronous rectification MOS transistors, the two synchronous rectification MOS transistors may be controlled by secondary side control circuits provided for the two MOS transistors, respectively, or may be controlled by a common secondary side control circuit. In the case where the two synchronous rectification MOS transistors are controlled by a common secondary side control circuit, the peak/bottom of one drain voltage VDS on the secondary side is equivalent to the bottom/peak of the other drain voltage VDS. Thus, it is also possible to reduce the circuit scale by setting the minimum on-time on the basis of the one drain voltage VDS, or measure both the drain voltages VDS and determine that an abnormality has occurred when a difference occurs in the peak/bottom state.

What is claimed is:

1. A switching power supply device comprising:
   a transformer for voltage conversion;
   a synchronous rectification MOS transistor connected in series to a secondary side coil of the transformer;
   a secondary side control circuit that performs on/off control of the synchronous rectification MOS transistor based on a drain voltage of the synchronous rectification MOS transistor; and
   a minimum on-time setting circuit that sets a minimum on-time when turning on the synchronous rectification MOS transistor based on a peak period and a bottom period detected by the secondary side control circuit,
   wherein the minimum on-time setting circuit includes:
   a minimum on-time setting reference voltage generation circuit that generates a setting reference voltage in accordance with the detected peak period and the detected bottom period;
   an adjustment signal generation circuit that generates an adjustment signal in accordance with a ratio between the detected peak period and the detected bottom period; and
   a minimum on-time signal generation circuit that generates a minimum on-time signal equivalent to the minimum on-time in accordance with the setting reference voltage generated by the minimum on-time setting reference voltage generation circuit and with the adjustment signal generated by the adjustment signal generation circuit.

2. The switching power supply device according to claim 1, wherein the secondary side control circuit includes:
   a peak period detection circuit that detects a peak period of the drain voltage of the synchronous rectification MOS transistor; and
   a bottom period detection circuit that detects a bottom period of the drain voltage of the synchronous rectification MOS transistor, and
   wherein the minimum on-time setting circuit sets the minimum on-time at turn-on of the synchronous rectification MOS transistor based on the peak period detected by the peak period detection circuit and the bottom period detected by the bottom period detection circuit.

3. The switching power supply device according to claim 1, wherein the minimum on-time setting reference voltage generation circuit, the adjustment signal generation circuit, and the minimum on-time signal generation circuit generate the setting reference voltage, the adjustment signal, and the minimum on-time signal, respectively, for each switching cycle of the synchronous rectification MOS transistor.

4. The switching power supply device according to claim 1, wherein:
the adjustment signal generation circuit generates the adjustment signal in a case where the ratio between the detected peak period and the detected bottom period is larger than or equal to a predetermined value, and
the minimum on-time signal generation circuit generates the minimum on-time signal adjusted so as to make the minimum on-time shorter when the adjustment signal is received.

5. The switching power supply device according to claim 4, further comprising:
a sample-and-hold circuit that captures and holds the setting reference voltage for each switching cycle; and
a voltage difference determination circuit that determines a difference between the setting reference voltage and a reference voltage in an immediately preceding cycle,
wherein the minimum on-time signal generation circuit generates the minimum on-time signal adjusted so as to make the minimum on-time shorter in a case where the difference from the reference voltage in the immediately preceding cycle is larger than a predetermined value.

6. The switching power supply device according to claim 1, further comprising:
a gate driver circuit that includes a source side switch and a sync side switch, and that generates a gate drive voltage for performing on/off control of the synchronous rectification MOS transistor;
an off-timing detection circuit that detects a timing for turning off the synchronous rectification MOS transistor based on the drain voltage of the synchronous rectification MOS transistor;
an on-timing detection circuit that detects a timing for turning on the synchronous rectification MOS transistor based on the drain voltage; and
an on/off control circuit that generates a control signal for performing on/off control of the synchronous rectification MOS transistor based on a detection signal of the off-timing detection circuit, a detection signal of the on-timing detection circuit, and the minimum on-time signal,
wherein the on/off control circuit turns off the source side switch of the gate driver circuit when the minimum on-time indicated by the minimum on-time signal elapses.

7. A switching power supply device comprising:
a transformer for voltage conversion;
a synchronous rectification MOS transistor connected in series to a secondary side coil of the transformer;
a secondary side control circuit that performs on/off control of the synchronous rectification MOS transistor based on a drain voltage of the synchronous rectification MOS transistor; and
a minimum on-time setting circuit that sets a minimum on-time when turning on the synchronous rectification MOS transistor based on a peak period and a bottom period detected by the secondary side control circuit,
wherein the minimum on-time setting circuit includes:
a minimum on-time setting reference voltage generation circuit that generates a setting reference voltage in accordance with the detected peak period and the detected bottom period; and
a minimum on-time signal generation circuit that generates a minimum on-time signal equivalent to the minimum on-time in accordance with the setting reference voltage generated by the minimum on-time setting reference voltage generation circuit.

8. The switching power supply device according to claim 7, wherein the secondary side control circuit includes:
a peak period detection circuit that detects a peak period of the drain voltage of the synchronous rectification MOS transistor; and
a bottom period detection circuit that detects a bottom period of the drain voltage of the synchronous rectification MOS transistor, and
wherein the minimum on-time setting circuit sets the minimum on-time at turn-on of the synchronous rectification MOS transistor based on the peak period detected by the peak period detection circuit and the bottom period detected by the bottom period detection circuit.

9. The switching power supply device according to claim 7, further comprising:
a gate driver circuit that includes a source side switch and a sync side switch, and that generates a gate drive voltage for performing on/off control of the synchronous rectification MOS transistor;
an off-timing detection circuit that detects a timing for turning off the synchronous rectification MOS transistor based on the drain voltage of the synchronous rectification MOS transistor;
an on-timing detection circuit that detects a timing for turning on the synchronous rectification MOS transistor based on the drain voltage; and
an on/off control circuit that generates a control signal for performing on/off control of the synchronous rectification MOS transistor based on a detection signal of the off-timing detection circuit, a detection signal of the on-timing detection circuit, and the minimum on-time signal,
wherein the on/off control circuit turns off the source side switch of the gate driver circuit when the minimum on-time indicated by the minimum on-time signal elapses.

10. A switching power supply device comprising:
a transformer for voltage conversion;
a synchronous rectification MOS transistor connected in series to a secondary side coil of the transformer;
a secondary side control circuit that performs on/off control of the synchronous rectification MOS transistor based on a drain voltage of the synchronous rectification MOS transistor; and
a minimum on-time setting circuit that sets a minimum on-time when turning on the synchronous rectification MOS transistor based on a peak period and a bottom period detected by the secondary side control circuit,
wherein the minimum on-time setting circuit includes:
an adjustment signal generation circuit that generates an adjustment signal in a case where a ratio between the detected peak period and the detected bottom period is larger than or equal to a predetermined value; and a minimum on-time signal generation circuit that generates a minimum on-time signal equivalent to the minimum on-time in accordance with the adjustment signal generated by the adjustment signal generation circuit; and wherein the minimum on-time signal generation circuit generates the minimum on-time signal adjusted so as to make the minimum on-time shorter when the adjustment signal is received.

11. The switching power supply device according to claim 10, wherein the secondary side control circuit includes:
a peak period detection circuit that detects a peak period of the drain voltage of the synchronous rectification MOS transistor; and
a bottom period detection circuit that detects a bottom period of the drain voltage of the synchronous rectification MOS transistor, and
wherein the minimum on-time setting circuit sets the minimum on-time at turn-on of the synchronous rectification MOS transistor based on the peak period detected by the peak period detection circuit and the bottom period detected by the bottom period detection circuit.

12. The switching power supply device according to claim 10, further comprising:
a gate driver circuit that includes a source side switch and a sync side switch, and that generates a gate drive voltage for performing on/off control of the synchronous rectification MOS transistor;
an off-timing detection circuit that detects a timing for turning off the synchronous rectification MOS transistor based on the drain voltage of the synchronous rectification MOS transistor;
an on-timing detection circuit that detects a timing for turning on the synchronous rectification MOS transistor based on the drain voltage; and
an on/off control circuit that generates a control signal for performing on/off control of the synchronous rectification MOS transistor based on a detection signal of the off-timing detection circuit, a detection signal of the on-timing detection circuit, and the minimum on-time signal,
wherein the on/off control circuit turns off the source side switch of the gate driver circuit when the minimum on-time indicated by the minimum on-time signal elapses.

* * * * *